(12) United States Patent
Meer et al.

(10) Patent No.: US 7,200,207 B2
(45) Date of Patent: Apr. 3, 2007

(54) COMMUNICATION NETWORK FOR PROVIDING EMERGENCY SERVICES

(75) Inventors: Stephen Marc Meer, Niwot, CO (US); Gregory Wilfred Bruening, Boulder, CO (US); Lawrence W. Ciesla, Yorkville, IL (US); Michael W. DeWeese, Brighton, CO (US); Michael Jay Nelson, Louisville, CO (US); Peter Roy Schmidt, Westminster, CO (US); Robert Allen Sherry, Aurora, IL (US); John Lawrence Snapp, Sammamish, WA (US)

(73) Assignee: Intrado Inc., Longmont, CO (US)

( * ) Notice: Subject to any disclaimer, the term of this patent is extended or adjusted under 35 U.S.C. 154(b) by 36 days.

(21) Appl. No.: 10/816,613

(22) Filed: Apr. 2, 2004

(65) Prior Publication Data

US 2005/0201527 A1 Sep. 15, 2005

Related U.S. Application Data

(60) Provisional application No. 60/552,833, filed on Mar. 13, 2004.

(51) Int. Cl.
*H04M 11/00* (2006.01)
(52) U.S. Cl. .......................................... 379/45; 370/352
(58) Field of Classification Search ............ 379/37–51, 379/142.06, 216.01; 370/352, 259
See application file for complete search history.

(56) References Cited

U.S. PATENT DOCUMENTS

| | | | |
|---|---|---|---|
| 6,151,385 A | 11/2000 | Reich et al. | |
| 6,385,302 B1 | 5/2002 | Antonucci et al. | |
| 6,415,018 B1 | 7/2002 | Antonucci et al. | |
| 6,504,909 B1 | 1/2003 | Cook et al. | |
| 6,567,502 B2 | 5/2003 | Zellner et al. | |
| 6,584,307 B1 | 6/2003 | Antonucci et al. | |
| 6,587,545 B1 | 7/2003 | Antonucci et al. | |
| 6,600,812 B1 * | 7/2003 | Gentillin et al. ............. | 379/45 |
| 6,678,357 B2 | 1/2004 | Stumer et al. | |
| 6,680,998 B1 | 1/2004 | Bell et al. | |
| 6,707,888 B1 | 3/2004 | Cope | |
| 6,771,742 B2 * | 8/2004 | McCalmont et al. ......... | 379/45 |
| 2002/0057764 A1 | 5/2002 | Salvucci et al. | |
| 2003/0086539 A1 | 5/2003 | McCalmont et al. | |

\* cited by examiner

*Primary Examiner*—Stella Woo

(57) ABSTRACT

The invention comprises a communication network that includes a plurality of conforming emergency systems, a packet network, and an emergency services network. The emergency services network includes a plurality of response gateways and a plurality of emergency services. Each of the conforming emergency systems facilitates the establishment of a media channel with one of the response gateways. In any one of the conforming emergency systems, responsive to establishing a media channel over the packet network with a response gateway and responsive to an emergency event (e.g., a 9-1-1 call, a 1-1-2 call, etc), the conforming emergency system transmits a retrieval key for the emergency event over the established media channel to the response gateway. The response gateway transmits a query for information corresponding with the retrieval key. Responsive to receiving the information originating from the individual emergency services corresponding with the retrieval key, the response gateway transmits the information over the media channel to the conforming emergency system.

59 Claims, 12 Drawing Sheets

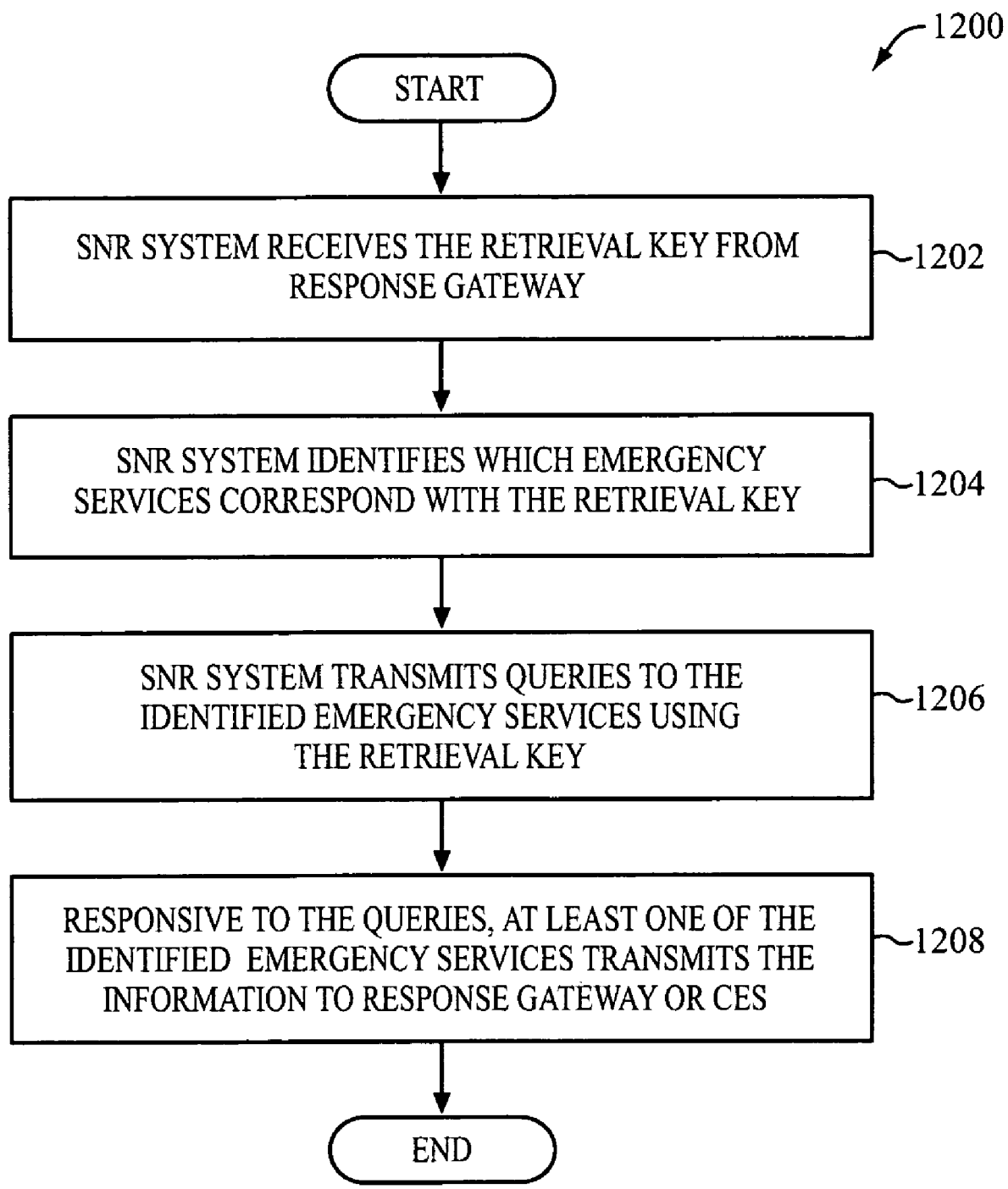

COMMUNICATION NETWORK FOR PROVIDING EMERGENCY SERVICES

RELATED APPLICATIONS

This non-provisional application claims priority to U.S. provisional application 60/552,833, which was filed on Mar. 13, 2004.

BACKGROUND OF THE INVENTION

1. Field of the Invention

The invention is related to the field of emergency services, and in particular, to a communication network for providing emergency services.

2. Statement of the Problem

In the United States, basic 9-1-1 service is an emergency reporting service where a calling party can dial 9-1-1 in emergency situations. The call is answered at a Public Safety Answering Point (PSAP, also known as a "Public Safety Access Point"). An operator at the PSAP converses with the calling party to determine information on the emergency situation. For instance, the operator may ask the calling party for his/her name, the nature of the emergency, and the location of the emergency, etc. Based on the information gathered by the operator, the operator then contacts emergency personnel to respond to the emergency.

Enhanced 9-1-1 service (E9-1-1) has the added feature of automatically providing the operator with some information on the calling party. For instance, E9-1-1 service includes the added features of Automatic Number Identification (ANI) and Automatic Location Identification (ALI). With Automatic Number Identification (ANI), the operator is automatically provided with telephone number of the phone placing the call for emergency services (e.g., a 9-1-1 call). With Automatic Location Identification (ALI), the PSAP, or another device, queries an ALI database for information on the physical location of the calling party's phone. An ALI database stores records of telephone numbers. A record in the ALI database contains information (such as a street address) on a physical location that corresponds with a telephone number. Responsive to a query from the PSAP, the ALI database returns the location information for the calling party. With the telephone number and the location information, the operator can more effectively handle the emergency call. Other countries have emergency services similar to this.

Traditional communication networks have a rigid architecture for providing emergency services. In a traditional communication network, a PSAP connects to a pair of ALI databases in the emergency services network. A pair of ALI databases is used for redundancy and reliability. The PSAP connects to each ALI database over a dedicated point-to-point connection. The ALI databases are the only resources in the emergency services network that connect with the PSAP and that can serve a request from the PSAP. The PSAP is not able to dynamically connect with other ALI databases or other resources in the emergency services network. The PSAP is unfortunately dependant on the pair of ALI databases to provide information for a 9-1-1 call.

Also, if one of the ALI databases were to be taken out of service for maintenance or upgrades, then the PSAP would be connected to a single ALI database and would become one-sided. If the remaining ALI database was to go out of service, then the PSAP would not be able to adequately service 9-1-1 calls. Emergency services administrators try to avoid architectures that rely on a single device or system because of the higher possibility of a service outage.

SUMMARY OF THE SOLUTION

The invention helps solve the above and other problems with a communication network having an improved interface between conforming emergency systems (e.g., a PSAP) and emergency services of an emergency services network. With the new architecture, conforming emergency systems may communicate with more than just a pair of ALI databases. Thus, conforming emergency systems are not reliant on the pair of ALI databases as the sole interface to emergency services of an emergency services network. Also, conforming emergency systems would not be left one-sided if an ALI database were to be taken out of service.

One embodiment of the invention comprises a communication network that includes a plurality of conforming emergency systems, a packet network, and an emergency services network. The emergency services network includes a plurality of response gateways and a plurality of emergency services. Each of the conforming emergency systems facilitates the establishment of a media channel with one of the response gateways over the packet network to interface with the emergency services network. In any one of the conforming emergency systems, responsive to establishing a media channel with a response gateway and responsive to an emergency event (e.g., a 9-1-1 call, a 1-1-2 call, a request for emergency information, etc), the conforming emergency system transmits a retrieval key over the established media channel to the response gateway. The response gateway transmits a query for information corresponding with the retrieval key within the emergency services network. The query may be transmitted to the emergency services or to another system that queries the emergency services for the response gateway. Responsive to receiving information originating from the individual emergency services corresponding with the retrieval key, the response gateway transmits the information over the media channel to the conforming emergency system. When the conforming emergency system receives the information corresponding with the retrieval key, the conforming emergency system can use the information to handle the emergency event.

The invention includes other networks, systems, and methods described below.

DESCRIPTION OF THE DRAWINGS

The same reference number represents the same element on all drawings.

FIG. 12 is a flow chart illustrating another method in another exemplary embodiment of the invention.

DETAILED DESCRIPTION OF THE INVENTION

Description of the Prior Art

Figure 1:
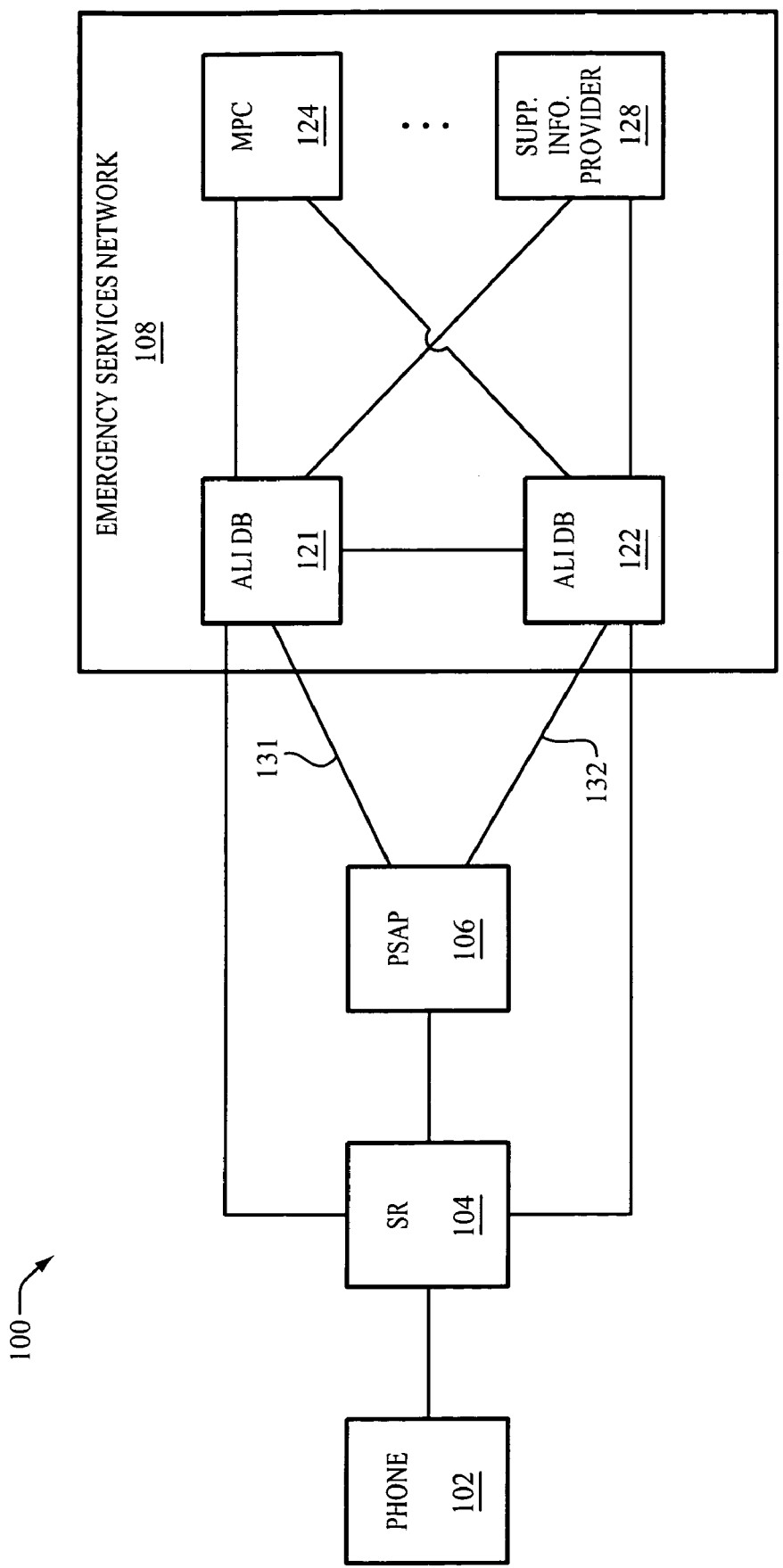
FIG. 1 illustrates a communication network that provides emergency services in the prior art, such as 9-1-1 service in the United States.

FIG. 1 illustrates a prior art communication network 100 that provides emergency services. Communication network 100 includes a telephone 102, a selective router (SR) 104, a Public Safety Answering Point (PSAP) 106, and an emergency services network 108. Emergency services network 108 includes two ALI databases 121–122, a Mobile Positioning Center (MPC) 124 (or a Gateway Mobile Location Center (GMLC)), a supplemental information provider 128, and other backend resources (not shown). Although a single MPC 124 and a single supplemental information provider 128 are illustrated in FIG. 1, emergency services network 108 generally includes multiple MPCs and supplemental information providers. As shown in FIG. 1, telephone 102 is connected to selective router 104. Selective router 104 is connected to PSAP 106 and ALI databases 121–122. PSAP 106 is connected to ALI databases 121–122. ALI database 121 is connected to ALI database 122, MPC 124, and supplemental information provider 128. ALI database 122 is connected to ALI database 121, MPC 124, and supplemental information provider 128.

Paired ALI databases 121–122 are used in emergency services networks, such as emergency service network 108, to add redundancy and reliability into the network. Each PSAP 106 (only one is shown) connects to two ALI databases 121–122. For the PSAP-ALI interface, PSAP 106 is connected to ALI database 121 by a dedicated point-to-point connection 131, and is connected to ALI database 122 by a dedicated point-to-point connection 132. The PSAP-ALI interface traditionally includes fixed point-to-point data circuits utilizing asynchronous data modems for the dedicated connections 131–132. In newer versions of the PSAP-ALI interface, dedicated connections 131–132 may include an upgraded transport protocol, such as Internet Protocol (IP) or X.25. Regardless of the transport protocol, the logical connections between PSAP 106 and ALI databases 121–122 remain point-to-point dedicated connections 131–132.

To illustrate how communication network 100 operates, assume that a caller dials 9-1-1 or a similar emergency number on telephone 102. Selective router 104 receives the emergency call, such as through a central office (not shown), a tandem switch (not shown), etc. Selective router 104 also receives an Emergency Service Number (ESN) associated with the location of the calling party from one or more ALI databases 121–122 or from another database (not shown). In FIG. 1, based on the ESN, selective router 104 selects PSAP 106 to handle the call and routes the emergency call to PSAP 106. Networks may route the emergency call to PSAP 106 in different ways depending on the desired implementation. Some examples of different implementations are illustrated in U.S. Pat. No. 6,415,018, U.S. Pat. No. 6,584,307, U.S. Pat. No. 6,385,302, and U.S. Pat. No. 6,587,545, which are all incorporated herein by reference to the same extent as if fully set forth herein.

Emergency services network 108, which provides E9-1-1 services, includes Automatic Location Identification (ALI) services. When PSAP 106 receives the emergency call, PSAP 106 also receives an ANI for the call. The ANI, which is the telephone number of the calling party telephone 102, allows an operator in PSAP 106 to call the calling party back if the call happens to be terminated. The ANI also allows the PSAP 106 to fetch information on the physical location of the calling party in order to dispatch the appropriate emergency personnel (e.g., police, ambulance, fire department). To fetch the location information, PSAP 106 generates a request for the location information that includes the ANI of telephone 102, and forwards the request to ALI database 121 over dedicated connection 131. PSAP 106 may forward the request to ALI database 122 over dedicated connection 132 in addition to forwarding the request to ALI database 121 or instead of forwarding the request to ALI database 121.

ALI database 121 receives the request for location information that includes the ANI. ALI database 121 searches for location information corresponding with the ANI. If ALI database 121 finds location information corresponding with the ANI, then ALI database 121 responds to PSAP 106 with the location information. If ALI database 121 does not find location information corresponding with the ANI, then ALI database 121 may have to query other ALI databases or other databases or systems for the location information.

ALI database 121 acts as an intermediary between PSAP 106 and the other emergency services in emergency services network 108. PSAP 106 does not directly connect with emergency services other than ALI databases 121–122. PSAP 106 communicates with MPC 124 and supplemental information provider 128 through one or both of ALI databases 121–122. For instance, if telephone 102 is a mobile phone, then ALI database 121 queries MPC 124 or another MPC (not shown) for location information corresponding with the ANI and forwards the location information to PSAP 106. ALI database 121 may provide supplemental information provider 128 with the ANI, and supplemental information provide 128 may provide services such as notifying third parties of the emergency call. In each of these cases, ALI database 121 interfaces PSAP 106 with the other emergency services.

When PSAP 106 receives a response from ALI database 121, PSAP 106 should be better informed to handle the emergency call. For instance, PSAP 106 should have location information for the calling party. PSAP 106 then informs the appropriate emergency personnel of the emergency call so that the emergency personnel can be quickly dispatched.

One problem with current emergency services networks is that the PSAP-ALI interface uses dedicated point-to-point connections 131–132 between PSAP 106 and ALI databases 121–122. PSAP 106 is not able to dynamically connect with another ALI database (not shown) or another resource in emergency services network 108. PSAP 106 is dependant on the pair of ALI databases 121–122 to provide information for an emergency call. If one of the ALI databases 121 were to be taken out of service for maintenance or upgrades, then PSAP 106 would be connected to a single ALI database 122 and become one-sided. If the remaining ALI database 122 was to go out of service, then PSAP 106 would not be able to adequately service emergency calls. Emergency services administrators try to avoid architectures that rely on a single device or system because of the higher possibility of a service outage.

Another problem with current emergency services networks is the traditional PSAP-ALI interface uses a limited message set. Most conventional PSAPs fundamentally include the same design as when they were initially conceived in the 1970's. The conventional PSAPs are configured to receive a fixed-length, pre-defined text string. The fixed-length text string limits the number of fields and the size of the fields that can be included in the text string. The small size of the text stream severely constrains the amount of information that the ALI database can provide to the PSAP, the context that can be created, and the data types that can be supported. Emergency services administrators have had to "overload" the text string, using the same fixed-length field for multiple purposes in different contexts, to provide the current services. New services or new capabilities are very difficult to add if the text string is overloaded by the current services. For instance, an ALI database would not be able to provide or would only be able to provide very limited individual medical information to the PSAP. Also, the technology does not lend itself to streaming video to the PSAP as the traditional message set does not have the capacity.

Another problem with current emergency services networks is that the PSAP-ALI interface model is a request-response model. The PSAP forwards a request for ALI information to the ALI database, and the ALI database provides a response to the PSAP. Under the current model, the PSAP has to initiate communication with the ALI database with a request for ALI information. The ALI database is not allowed or equipped to initiate a communication with the PSAP, or deliver ALI information to the PSAP unless the PSAP submits a request. The current PSAP-ALI interface model limits the types of enhanced services provided by the emergency services network.

The following example illustrates some of the problems and limitations of the current emergency services networks. Assume that telephone 102 comprises a mobile telephone and that a user of telephone 102 dials 9-1-1. Selective router 104 routes the 9-1-1 call to PSAP 106. PSAP 106 submits a request to ALI database 121 for information for the 9-1-1 call. The request includes an ANI. Responsive to receiving the request, ALI database 121 determines that the ANI is a pseudo-ANI corresponding with a wireless service provider for telephone 102. The ANI is not the actual telephone number of telephone 102, but is a key corresponding with basic information identifying the wireless service provider and/or identifying the cell tower from which the 9-1-1 call originated.

Because the pseudo-ANI is for a wireless service provider, ALI database 121 does not have location information for the pseudo-ANI. Consequently, ALI database 121 cannot immediately provide the location information to PSAP 106 because it must attempt to retrieve location information for telephone 102. ALI database 121 retrieves the location information by submitting a request to the wireless service provider's MPC 124. Because the PSAP-ALI interface allows only one response to a request, ALI database 121 attempts to collect all call information before responding to PSAP 106. ALI database 121 also attempts to ensure that PSAP 106 receives a response within a reasonable amount of time. Before submitting the request to MPC 124, ALI database 121 sets a timer to indicate how long it will wait for MPC 124 to respond. If MPC 124 responds within the time period, then ALI database 121 responds to PSAP 106 with the location information on telephone 102. The location information may be approximate X, Y coordinates (longitude and latitude) of telephone 102 (assuming a wireless Phase II system).

If MPC 124 does not respond within the time period, then ALI database 121 responds to PSAP 106 with basic call information. The basic call information does not specify the location of telephone 102. The basic call information may merely be information on the wireless service provider or information on the cell tower from which the 9-1-1 call originated. If MPC 124 responds to ALI database 121 with the location information after ALI database 121 has already responded to PSAP 106 with the basic information, ALI database 121 cannot provide the location information on telephone 102 to PSAP 106. As previously stated, ALI database 121 cannot transmit information to PSAP 106 unless PSAP 106 has previously transmitted a request to ALI database 121 that remains unanswered. To obtain the location information from ALI database 121, PSAP 106 will have to submit another request to ALI database 121 for the same information (sometimes referred to as a re-bid).

If ALI database 121 receives another request from PSAP 106, then ALI database 121 will need to determine whether to send the previous location information received from MPC 124, request new location information from MPC 124, handle time-out scenarios, and handle situations where this request may be for a new 9-1-1 call using the same pseudo-ANI. This scenario is further complicated because the ALI database 121 does not know when this call ends and another call with the same pseudo-ANI begins. Thus, ALI database 121 uses an elaborate scheme of timers to determine if the information received from MPC 124 is stale, and determines whether it should return the information for subsequent requests from PSAP 106 or whether it should submit new requests to MPC 124. While ALI database 121 is requesting information from MPC 124 and PSAP 106 is waiting for a response, PSAP 106 may be connected with a calling party possibly engaged in a life or death situation where any bit of information might help determine the best course of action. ALI database 121 cannot tell that it takes more time to determine location information for telephone 102 because of technology overhead. PSAP 106 may have to wait 10 to 15 seconds to be told nothing more than that the 9-1-1 call is a wireless call.

The PSAP-ALI interface puts the PSAP operator in a guessing game. The PSAP operator does not know when the wireless call location information becomes available and does not know how often re-bids should be submitted to receive initial or new information. PSAP operators are taught not to push the re-bid button repeatedly in hopes of getting caller information, as this could have the opposite effect and swamp ALI database 121 or MPC 124 in a manner such that PSAP 106 cannot receive a response.

As is illustrated above, the current emergency services networks use old technology, are not very flexible in updating or improving existing services, and are not readily expandable to add new and better services. The importance of emergency services networks demands that these networks evolve to provide the best and most reliable services.

DESCRIPTION OF THE INVENTION

FIGS. 2–12 and the following description depict specific embodiments of the invention to teach those skilled in the art how to make and use the best mode of the invention. For the purpose of teaching inventive principles, some conventional aspects of the invention have been simplified or omitted. Those skilled in the art will appreciate variations from these embodiments that fall within the scope of the invention. Those skilled in the art will appreciate that the features described below can be combined in various ways to form multiple variations of the invention. As a result, the invention is not limited to the specific embodiments described below, but only by the claims and their equivalents.

Figure 2:
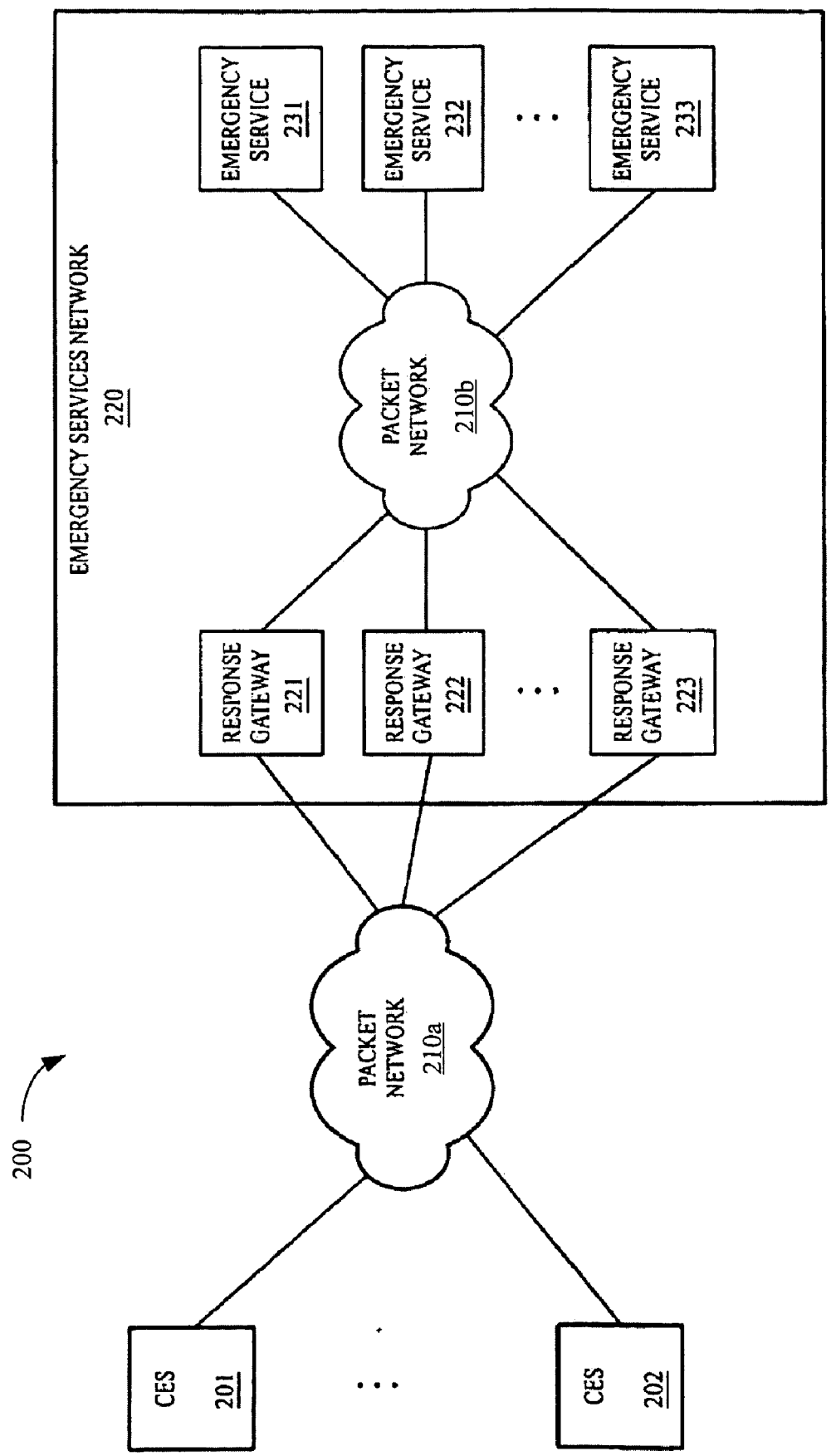
FIG. 2 illustrates a communication network in an exemplary embodiment of the invention.

FIG. 2 illustrates a communication network 200 in an exemplary embodiment of the invention. Communication network 202 includes a plurality of conforming emergency systems (CES) 201–202, a packet network 210a, and an emergency services network 220. Emergency services network 220 includes a plurality of response gateways 221–223 and a plurality of emergency services 231–122. CESs 201-2-2 and response gateways 221–223 are connected to packet network 210a. Emergency services 231–233 are shown as connected to packet network 210b, but emergency services 231–233 may be connected to response gateways 221–223 over a network other than a packet network. Communication network 200 may include other devices, resources, or systems not shown in FIG. 2 for the sake of brevity. FIG. 2 is intended to illustrate communications network 200 in a more functional manner than a physical manner. Depending on the embodiment, response gateway 221 may be part of CES 201, may be part of emergency services 231–233, or an independent system.

A conforming emergency system comprises any system, device, or equipment configured to communicate according to the message set used by an emergency services network to access emergency services (not shown) to handle emergency events. One example of a conforming emergency system is a computer system for a Public Safety Answering Point (PSAP) conforming to the message set used by an emergency services network. A PSAP is known in the art of emergency services as a location where an emergency call (e.g., a 9-1-1 call) is answered. Another example of a conforming emergency system is a computer system for a hospital, a police department, a fire station, a fire alarm company, a security company, an ambulance service, a state 9-1-1 coordinator, the Federal Emergency Management Agency (FEMA), the Department of Homeland Security, the National Geophysical Data Center, the Center for Disease Control (CDC), etc, that conforms to the message set used by an emergency services network and is used to access in emergency services to handle emergency events. An emergency event comprises any instance or situation where a request for emergency services may be made. Examples of an emergency event include any abbreviated number call (e.g., a 9-1-1 call in the U.S., a 3-1-1 call in the U.S., and a 1-1-2 call in Europe), any call or request from a computer, a PDA, a TDD device, or any other device for emergency services, an email message, an SMS message, an Internet message, a call or signal to an emergency call center (e.g., an independent alarm service, OnStar®, etc), or any other request for emergency services.

A packet network comprises any network that transports messages in the form of packets or cells. Examples of a packet network include an Internet Protocol (IP) network, a frame relay network, an X.25 network, an Asynchronous Transfer Mode (ATM) network, etc. Packet networks 210a and 210b are illustrated herein as separate networks. Packet networks 210a and 210b may be two isolated networks, may be two networks that communicate with each other via, for, example a gateway (not shown but well known in the art) or may be two parts of a single network.

A response gateway comprises any system, server, or equipment configured to communicate with a conforming emergency system via a media channel over a packet network, and interface the conforming emergency system with emergency services of an emergency services network. A media channel comprises any communication path or paths (logical, virtual, or otherwise) over a transport network configured to transport data such as streaming video, streaming audio, voice, graphics, text data, binary data, executable instructions or scripts, etc. A media channel is not a physical or logical point-to-point dedicated connection over a transport network. The media channel may transport control messages or may operate in conjunction with a separate control channel.

An emergency services network includes any network or networks that provide emergency services or facilitates a conforming emergency system in handling emergency events. Emergency services comprise any services subscribed to or provided for an emergency call or other event requiring such services. One example of an emergency service is an ALI database that provides location information. Another example of an emergency service is a Mobile Positioning Center (MPC) or a Gateway Mobile Location Center (GMLC) that provides location information for mobile devices. Another example of an emergency service is a Voice over Internet Protocol (VoIP) server or a selective transfer point determination system that provides location information for a VoIP phone or device. Another example of an emergency service is an Emergency Auxiliary Service Provider (EASP) or an Emergency Information Service that are general terms for any service provider that provides information or performs a function. For instance, an EASP may contain medical information for a subscriber and information on a subscriber's premises, such as a code to a front gate, guard dogs, hazardous materials, etc. The EASP may also include a third-party notification service that notifies third parties of an emergency event. The term "emergency service" is intended to include any accompanying structure that performs the emergency services, such as processing systems, computing platforms, network interfaces, servers, etc. Emergency services may be included in or as part of a response gateway, a response gateway may be included in a conforming emergency system, and/or a response gateway may interface a conforming emergency system with a remote emergency service.

CES 201 may connect with any one of response gateways 221–223 over packet network 210a to interface with emergency services network 220. Similarly, CES 202 may connect with any one of response gateways 221–223 over packet network 210a to interface with emergency services network 220. CESs 201–202 are not each connected to a pair of ALI databases by dedicated point-to-point connections as in the prior art. The interface between the CESs 201–202 and emergency services network 220 is described as follows.

Figure 3:
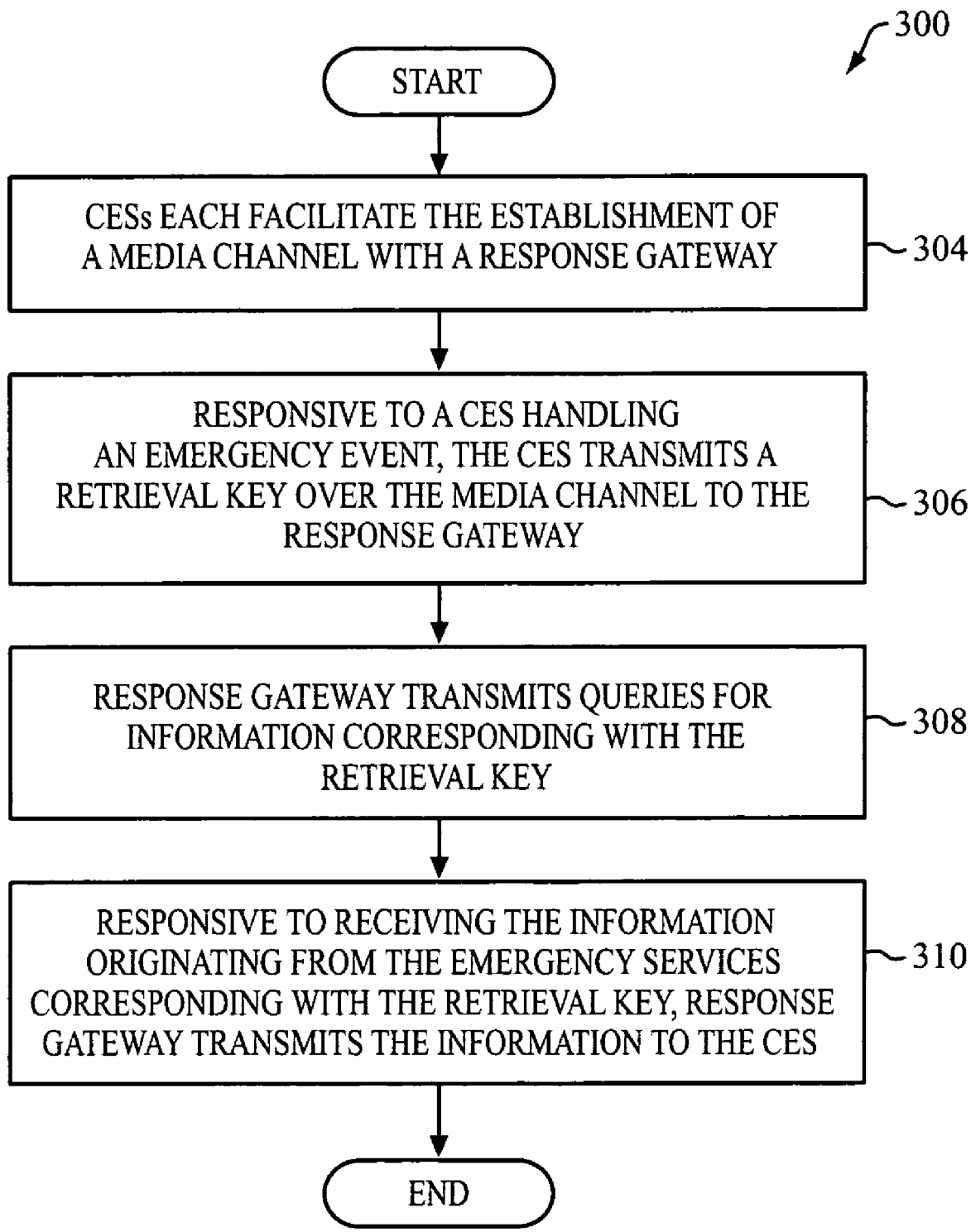
FIG. 3 is a flow chart illustrating a method of operating the communication network in an exemplary embodiment of the invention.

FIG. 3 is a flow chart illustrating a method 300 of operating communication network 200 in an exemplary embodiment of the invention. In step 304, each CES 201–202 facilitates the establishment of a media channel with one of the response gateways 221–223. The media channels may be dynamically established as described in FIG. 4.

In any one of CESs 201–202 (assume CES 201), responsive to establishing the media channel with a response gateway (assume response gateway 221) and responsive to an emergency event (e.g., a 9-1-1 call, a 1-1-2 call, etc) being handled by CES 201, CES 201 transmits a retrieval key over the established media channel to response gateway 221 in step 306.

A retrieval key comprises any indicator, token, or key, such as a telephone number (including a dialed number, Emergency Service Routing Digits (ESRD), Emergency Service Routing Keys (ESRK), or any other string of digits according to the E.164 encoding scheme), a network address (including a Session Initiation Protocol (SIP) address, a MAC address, an IP address, a Universal Resource Identifier, or any other form of identification associated with a communication device), a trunk ID, a social security number, a street address, an employee ID, an email address, and an incident ID. In step 308, response gateway 221 transmits a query for information corresponding with the retrieval key within emergency services network 220. Response gateway 221 may transmit the query to the emergency services containing information corresponding with the retrieval key or may transmit the query to another system.

Responsive to receiving information that originated from the individual emergency services 231–233 corresponding with the retrieval key, response gateway 221 transmits the information over the media channel to CES 201 in step 310. When CES 201 receives the information corresponding with the retrieval key, CES 201 can use the information to handle the emergency event. Steps 306–310 may be repeated for CES 202 or any other CES handling an emergency event.

Figure 4:
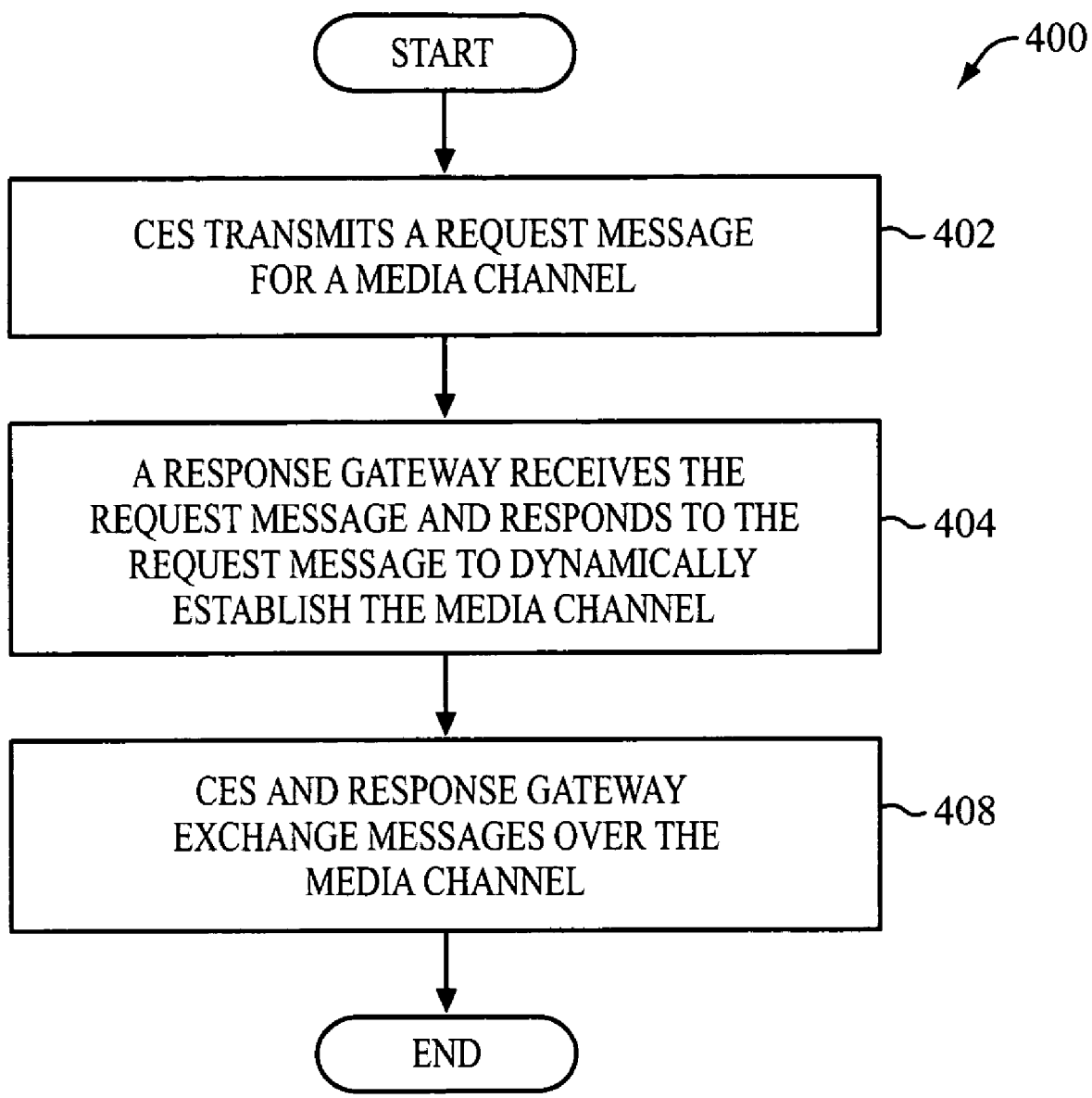
FIG. 4 is a flow chart illustrating a method for dynamically establishing a media channel between a conforming emergency system and a response gateway in an exemplary embodiment of the invention.

FIG. 4 is a flow chart illustrating a method 400 for dynamically establishing a media channel between CES 201 and one of the response gateways 221–223 in FIG. 2 in an exemplary embodiment of the invention. In step 402, CES 201 transmits a request message for a media channel to packet network 210a. A selected one of the response gateways 221–223 (assume response gateway 221) in emergency services network 220 receives the request message, in step 404. CES 201, response gateways 221–223, or another system may include selection logic (not shown) or an algorithm for selecting response gateway 221. In transmitting the request message to packet network 210a, CES 201 may transmit the request message to response gateway 221 or to another system. Also in step 404, response gateway 221 responds to the request message to dynamically establish the media channel between CES 201 and response gateway 221. CES 201 and response gateway 221 may then exchange messages over the media channel in step 408. The exchanged messages may include the information from emergency services 231–233 as described in FIG. 3.

In responding to the request message, response gateway 221 may transmit a response message to packet network 210a. The response message indicates an acceptance of the media channel, indicates the acceptance of parameters of the media channel, or otherwise indicates that response gateway 221 is available and capable of handling the media channel. Response gateway 221 may also negotiate parameters of the media channel before transmitting the response message. In transmitting the response message to packet network 210a, response gateway 221 may transmit the response message to CES 201 or to another system. Responsive to receiving the response message, CES 201 initiates a process to dynamically establish the media channel. One example of a process initiated by CES 201 is setting up a Secure Sockets Layer (SSL) TCP/IP interface.

Alternatively, in responding to the request message, response gateway 221 may initiate a process to dynamically establish the media channel between CES 201 and response gateway 221. One example of a process initiated by response gateway 221 is setting up a Secure Sockets Layer (SSL) TCP/IP interface.

In other embodiments, one of the response gateways 221–223 may initiate the setup of a media channel with CES 201. In such a case, a response gateway (assume response gateway 223) transmits a request message for a media channel to packet network 210a. CES 201 receives the request message and responds to the request message to dynamically establish the media channel. CES 201 and response gateway 223 may then exchange messages over the media channel.

In responding to the request message, CES 201 may transmit a response message to packet network 210a responsive to receiving the request message. The response message indicates an acceptance of the media channel, indicates the acceptance of parameters of the media channel, or otherwise indicates that CES 201 is available and capable of handling the media channel. CES 201 may also negotiate parameters of the media channel before transmitting the response message. Responsive to receiving the response message, response gateway 223 initiates a process to dynamically establish the media channel.

Alternatively, in responding to the request message, CES 201 may initiate a process to dynamically establish the media channel between CES 201 and response gateway 221.

One example where response gateway 223 may initiate a media channel is if response gateway 223 receives information that may be important to CES 201. For instance, response gateway 223 may receive a video feed from a news station on an emergency event. Responsive to receiving the video feed, response gateway 223 may initiate a media channel with CES 201 and other CESs potentially serving the area of the emergency event to provide the CESs with the video feed.

Figure 5:
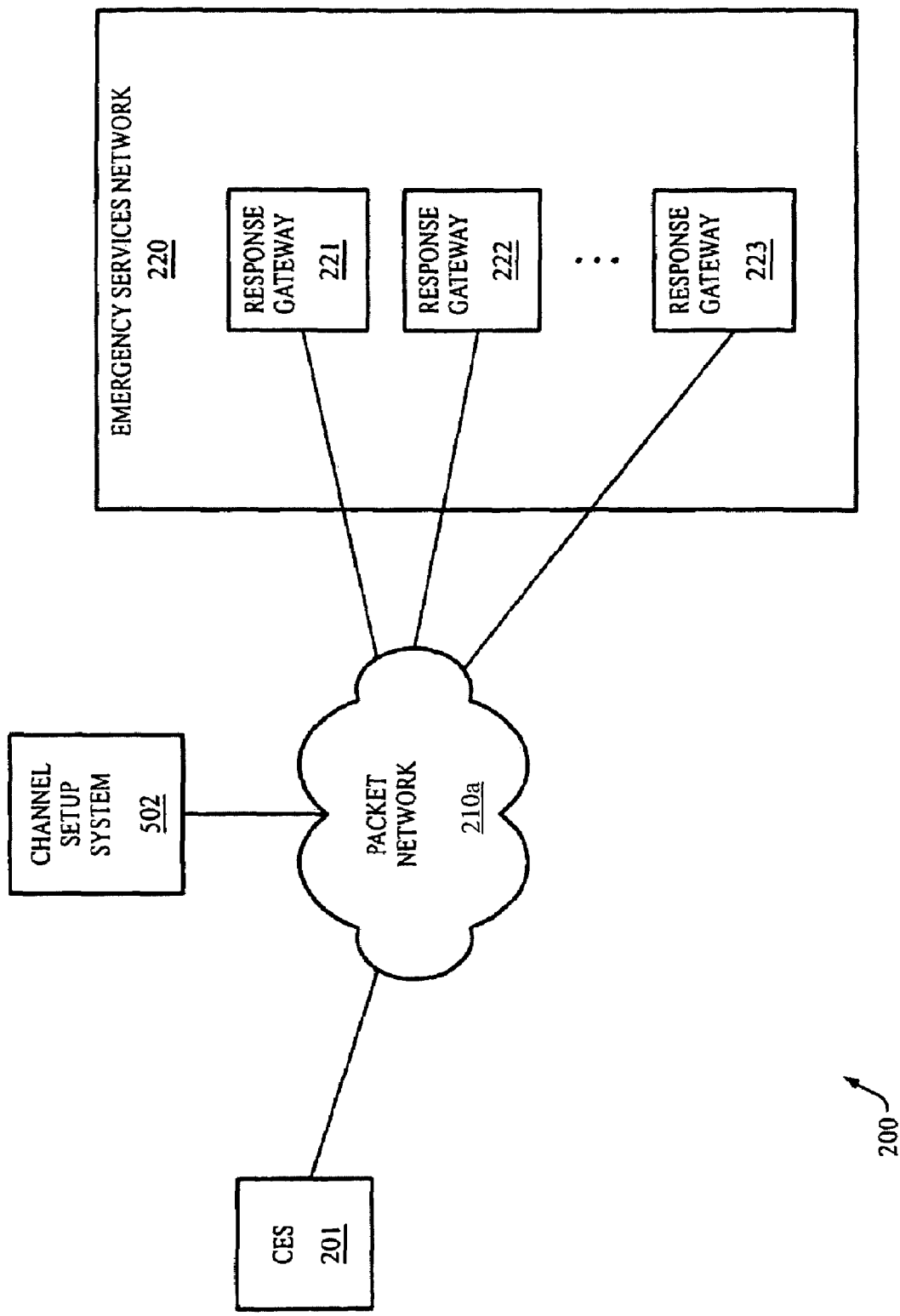
FIG. 5 illustrates a communication network that further includes a channel setup system in an exemplary embodiment of the invention.

FIG. 5 illustrates communication network 200 further including a channel setup system 502 in an exemplary embodiment of the invention. Channel setup system 502 is connected to packet network 210a. Channel setup system 502 comprises any system or server configured to assist in the setup of a media channel over packet network 210a. Examples of channel setup system 502 include a Session Initiation Protocol (SIP) server and a SIP proxy.

Figure 6:
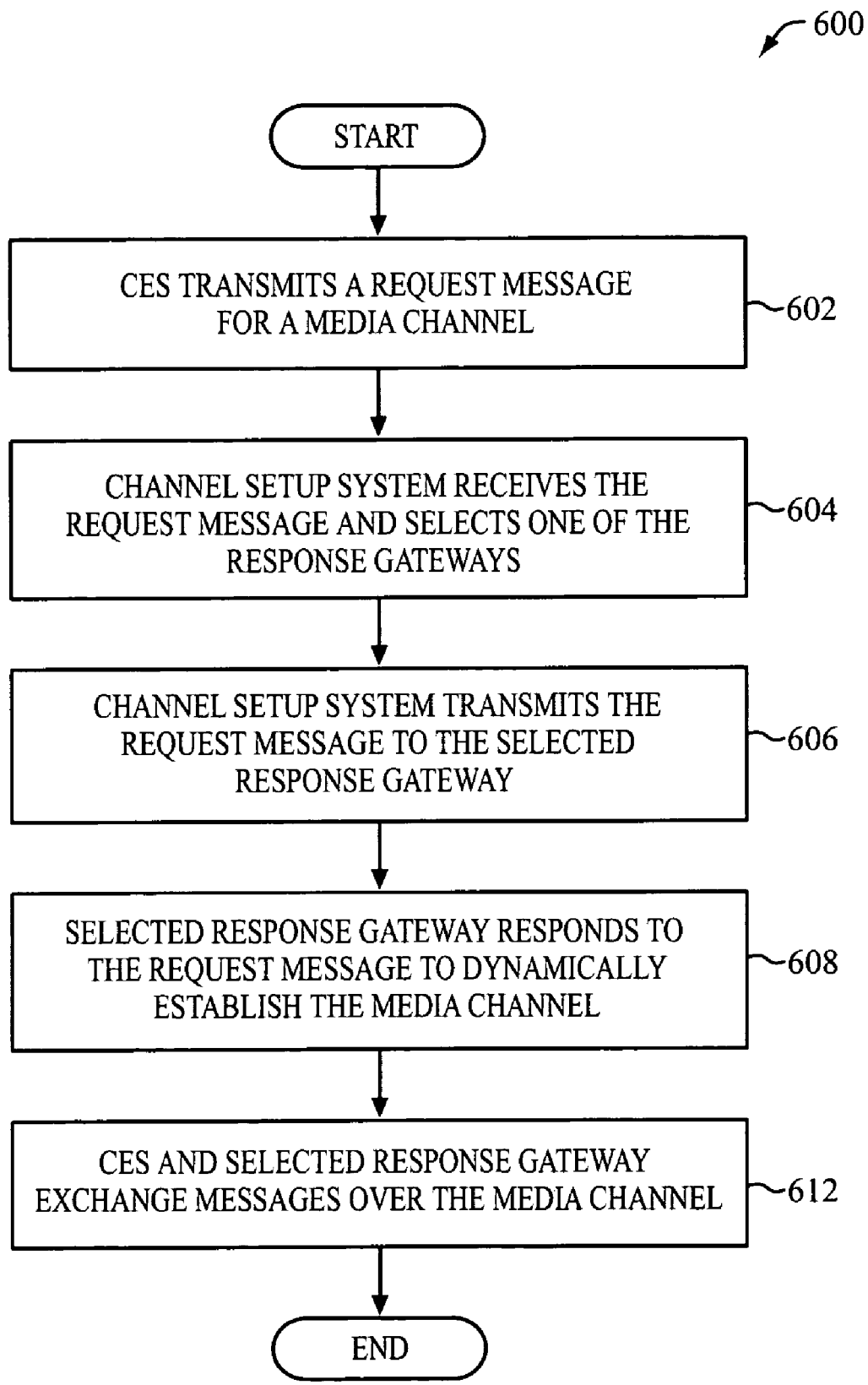
FIG. 6 is a flow chart illustrating a method for dynamically establishing a media channel using a channel setup system in an exemplary embodiment of the invention.

FIG. 6 is a flow chart illustrating a method 600 for dynamically establishing a media channel using channel setup system 502 in an exemplary embodiment of the invention. In step 602, CES 201 transmits a request message for a media channel to packet network 210a. Channel setup system 502 receives the request message for the media channel and selects one of the response gateways 221–223 (assume response gateway 221) in emergency services network 220 with which to establish the media channel, in step 604. In other embodiments, channel setup system 502 or another system may generate the request message to initiate the set up of the media channel. Channel setup system 502 may include selection logic (not shown) or an algorithm for selecting one of the response gateways 221–223. Channel setup system 502 then transmits the request message for the media channel to response gateway 221 in step 606.

Response gateway 221 receives the request message. Responsive to receiving the request message, response gateway 221 responds to the request message to dynamically establish the media channel, in step 608. CES 201 and response gateway 221 then exchange messages over the media channel in step 612.

In responding to the request message, response gateway 221 may transmit a response message to packet network 210a. The response message indicates an acceptance of the media channel, indicates the acceptance of parameters of the media channel, or otherwise indicates that response gateway 221 is available and capable of handling the media channel. Response gateway 221 may transmit the response message directly to CES 201, or may transmit the response message to channel setup system 502 and channel setup system 502 transmits the response message to CES 201. Responsive to receiving the response message, CES 201 initiates a process to dynamically establish the media channel.

Response gateway 221 may negotiate parameters of the media channel before transmitting the response message. If response gateway 221 and CES 201 cannot agree on parameters for the media channel, then response gateway 221 transmits a response message indicating a rejection of the media channel. Response gateway 221 may transmit the response message directly to CES 201 or may transmit the response message to CES 201 through channel setup system 502. If CES 201 receives a response message indicating a rejection of the media channel, then CES 201 may initiate and transmit a new request message to packet network 210*a*. If channel setup system 502 receives a response message indicating a rejection of the media channel, then channel setup system 502 selects another one of the response gateways 222–223 and transmits the request message to the newly selected resource.

Alternatively, in responding to the request message, response gateway 221 may initiate a process to dynamically establish the media channel between CES 201 and response gateway 221.

CES 201, channel setup system 502, and response gateway 221 may use Session Initiation Protocol (SIP), H.323, Signaling System No. 7 (SS7), LAPD, Q.921, Q.931, or another comparable protocol or method for dynamically establishing a media channel. Using SIP, the request message from CES 201 may comprise a SIP Invite message. Channel setup system 502, CES 201, and/or response gateways 221–223 are able to tear down the media channel after a time period or responsive to instructions.

In other embodiments, one of the response gateways 221–223 may initiate the setup of a media channel with CES 201. In such a case, a response gateway (assume response gateway 223) transmits a request message for a media channel to packet network 210*a*. Channel setup system 502 receives the request message and transmits the request message to CES 201. CES 201 receives the request message and responds to the request message to dynamically establish the media channel. CES 201 and response gateway 223 may then exchange messages over the media channel.

Figure 7:
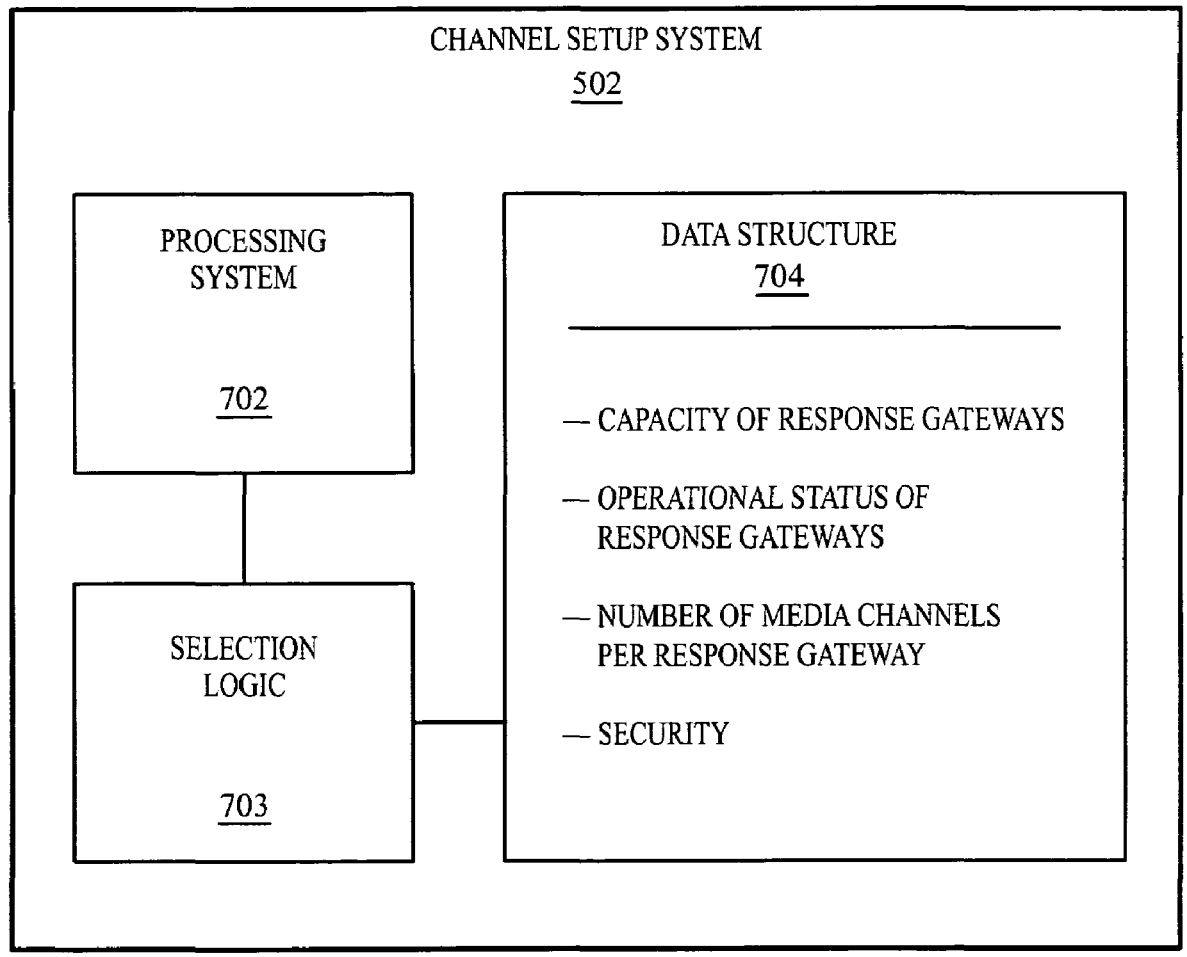
FIG. 7 illustrates a channel setup system in an exemplary embodiment of the invention.

FIG. 7 illustrates channel setup system 502 in an exemplary embodiment of the invention. Channel setup system 502 includes a processor 702, selection logic 703, and a data structure 704. Data structure 704 includes information on response gateways 221–223 of emergency services network 220, information on routing messages to systems connected to packet network 210*a*, and other information and data. For instance, data structure 704 may include information on the capacity or current load of each response gateway 221–223, information on the operational status of each response gateway (e.g., in service/out of service), information on the number of media channels per response gateway 221–223, information on security, information on the location of each response gateway 221–223, information on the data connectivity speed of each response gateway 221–223, information on the type of protocol used by each response gateway 221–223, information on the type of response gateway 221–223, etc. Data structure 704 may include much more information than that which is described. Each response gateway 221–223 may update channel setup system 502 as to information on that response gateway.

When in operation, channel setup system 502 receives a request message for a media channel. Responsive to the request message, processor 702 executes selection logic 703 to select one of the response gateways 221–223 in emergency services network 220 with which to establish the media channel. Selection logic 703 may identify the availability of each of the response gateways 221–223 in making the selection. For instance, in making the selection, selection logic 703 accesses data structure 704 for information on the individual response gateways. If response gateway 222 is at 90% of its capacity and response gateway 221 is a 10% of its capacity, then selection logic 703 may select response gateway 221. If response gateway 223 has failed or has been taken out of service for maintenance, then selection logic 703 will not select response gateway 223. If response gateways 222–223 are each currently serving one media channel and response gateway 221 is not serving any media channels, then selection logic 703 may select response gateway 221 to balance out the media channels between the response gateways 221–223. When selection logic 703 selects one of the response gateways 221–223, channel setup system 502 transmits the request message for the media channel to the selected response gateway.

Figure 8:
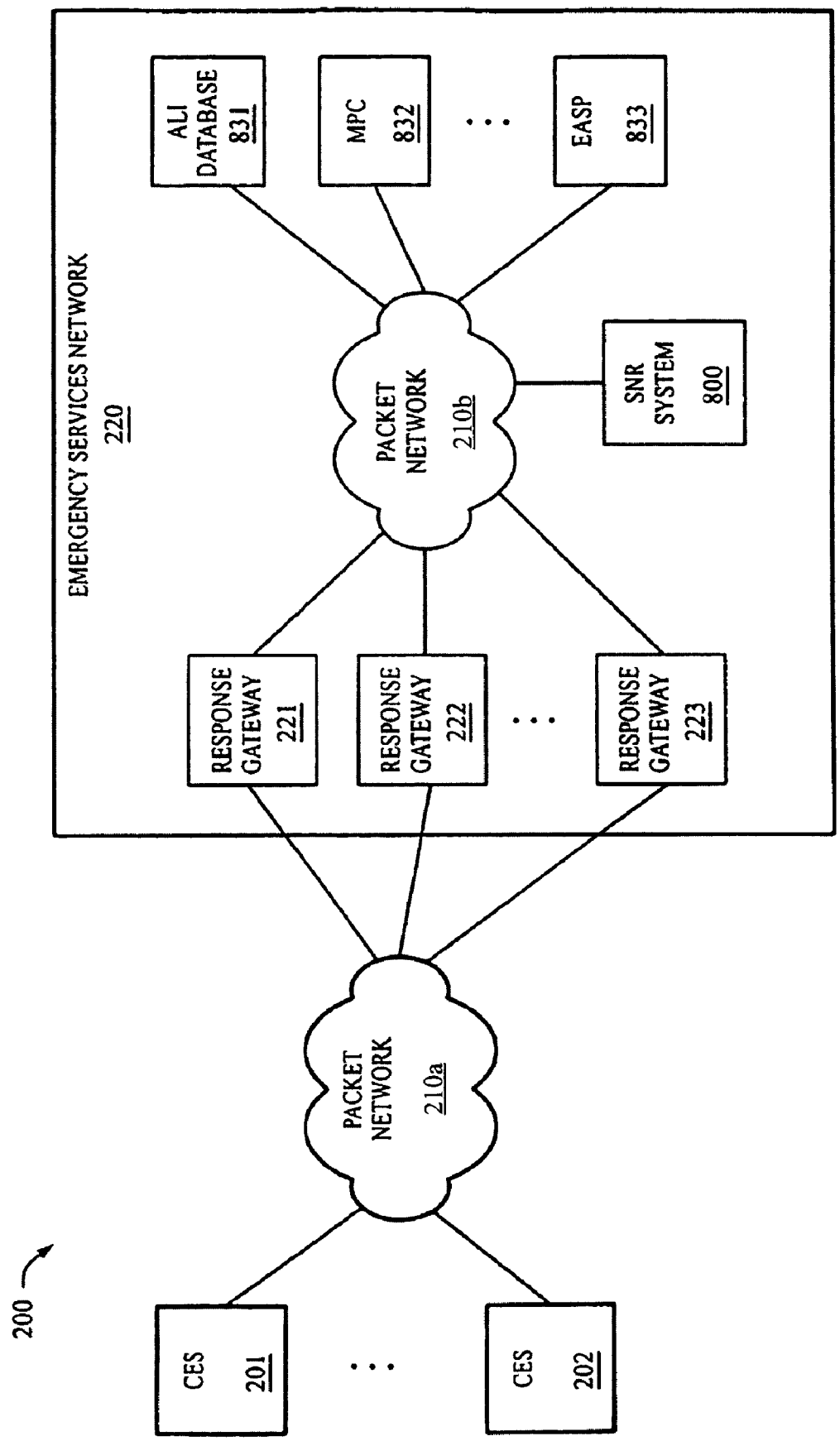
FIG. 8 illustrates a communication network that further includes an SNR system in an exemplary embodiment of the invention.

FIG. 8 illustrates communication network 200 further including an Service/Name Resolution (SNR) system 800 in an exemplary embodiment of the invention. Service/Name Resolution (SNR) system 800 is connected to packet network 210*b*. FIG. 8 shows the emergency services in emergency services network 220 as ALI database 831, Mobile Positioning Center (MPG) 832, and Emergency Auxiliary Service Provider (EASP) 833.

SNR system 800 is configured to communicate with ALI database 831, MPC 832, and EASP 833 so that ALI database 831, MPC 832, and EASP 833 can register the information that they contain with SNR system 800. SNR system 800 stores a directory of the information contained in each of ALI database 831, MPC 832, and EASP 833. The directory of information is indexed by a retrieval key. A retrieval key comprises any indicator, token, or key, such as a telephone number (including a dialed number, Emergency Service Routing Digits (ESRD), Emergency Service Routing Keys (ESRK), or any other string of digits according to the E.164 encoding scheme), a network address (including a Session Initiation Protocol (SIP) address, a MAC address, an IP address, a Universal Resource Identifier, or any other form of identification associated with a communication device), a trunk ID, a social security number, a street address, an employee ID, an email address, and an incident ID.

Figure 9:
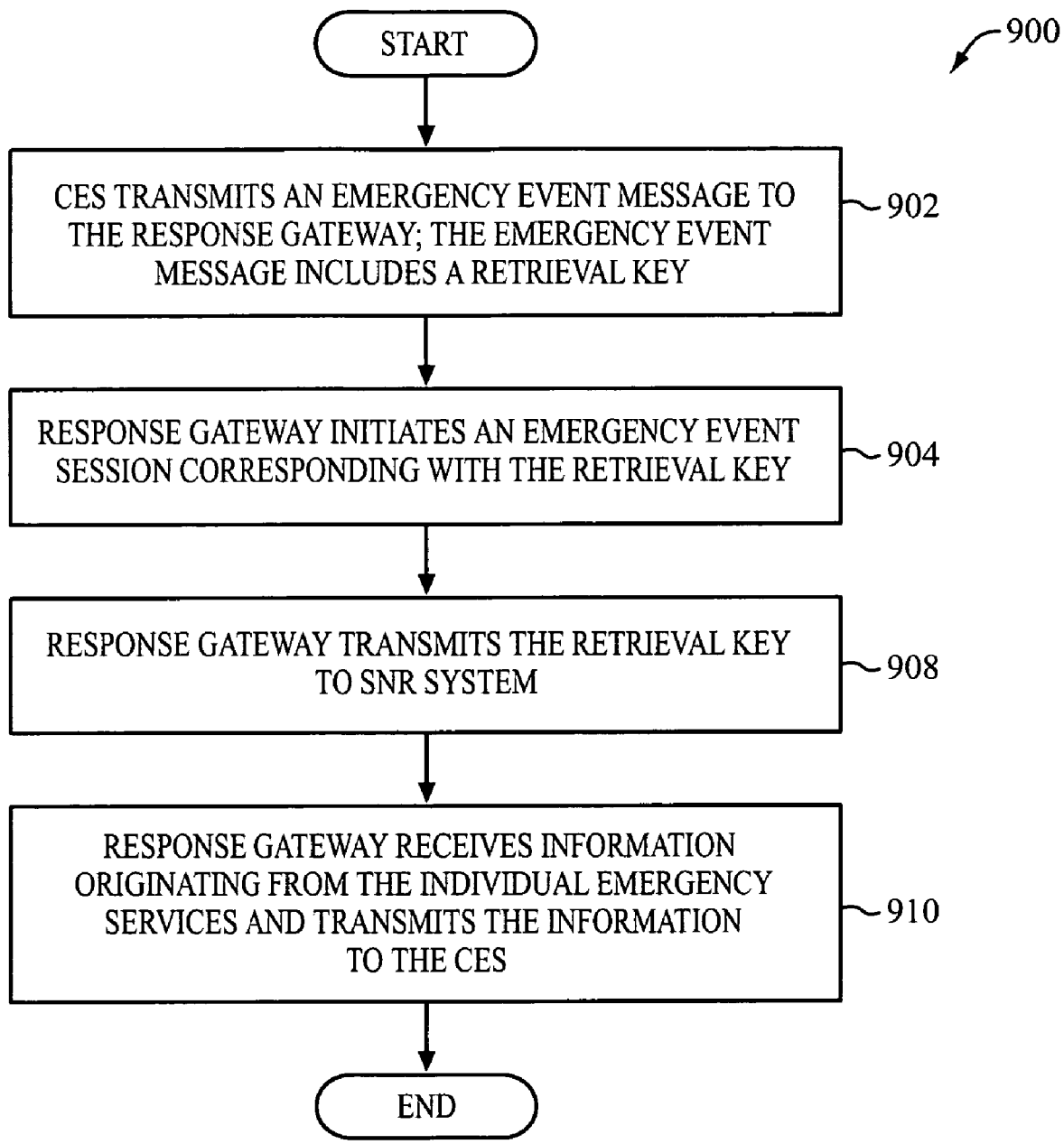
FIG. 9 is a flow chart illustrating communications in the communication network of FIG. 8 in an exemplary embodiment of the invention.

FIG. 9 is a flow chart illustrating communications in communication network 200 in an exemplary embodiment of the invention. Assume that CES 201 needs to access information in emergency services network 220 to handle an emergency event. CES 201 transmits an emergency event message to response gateway 221 over the media channel established between CES 201 and response gateway 221, in step 902. The emergency event message includes a retrieval key. Responsive to receiving the emergency event message and the retrieval key, response gateway 221 initiates an emergency event session corresponding with the retrieval key in step 904. An emergency event session comprises any period of communication between a conforming emergency system and a response gateway over a media channel for a particular retrieval key. Multiple emergency event sessions for multiple retrieval keys may be established over a media channel.

During the emergency event session, response gateway 221 transmits a query (including the retrieval key) to SNR system 800 in step 908. Response gateway 221 queries SNR system 800 to more efficiently obtain information corresponding with the retrieval key from the emergency services. The following methods illustrate ways that response gateway 221 may obtain the information from the emergency services.

Figure 10:
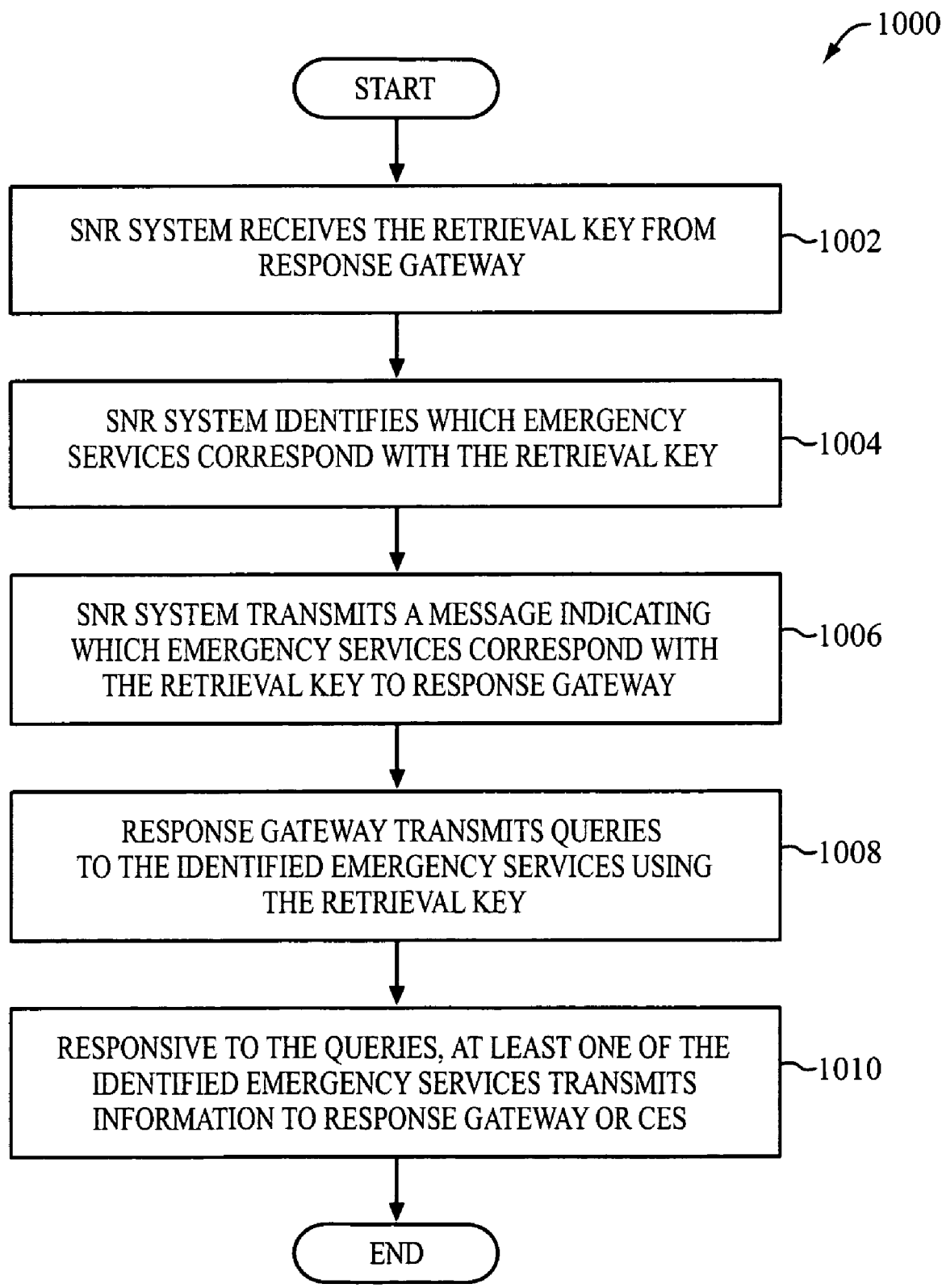
FIG. 10 is a flow chart illustrating a method in one exemplary embodiment of the invention.

FIG. 10 is a flow chart illustrating a method 1000 in an exemplary embodiment of the invention. In step 1002, SNR system 800 receives the retrieval key from response gateway 221. Responsive to the retrieval key, SNR system 800 accesses its directory of information for ALI database 831, MPC 832, and EASP 833. SNR system 800 identifies which of ALI database 831, MPC 832, and EASP 833 correspond with the retrieval key in step 1004. To "correspond with" means that ALI database 831, MPC 832, and/or EASP 833 include information associated with the retrieval key or that a subscriber has subscribed to ALI database 831, MPC 832, or EASP 833 using the retrieval key. SNR system 800 then transmits a message to response gateway 221 indicating which of ALI database 831, MPC 832, and EASP 833 correspond with the retrieval key in step 1006. Assume that SNR system 800 identifies that MPC 832 and EASP 833 correspond with the retrieval key. Responsive to the message from SNR system 800, response gateway 221 transmits queries to MPC 832 and EASP 833 using the retrieval key in step 1008. MPC 832 and EASP 833 each receive the query and perform any services corresponding with the retrieval key. In step 1010, at least one of MPC 832 and EASP 833 transmit information corresponding with the retrieval key to response gateway 221 or CES 201. For instance, MPC 832, having location information corresponding with the retrieval key, transmits the location information to response gateway 221. EASP 832, having medical information corresponding with the retrieval key, transmits the medical information to response gateway 221.

Figure 11:
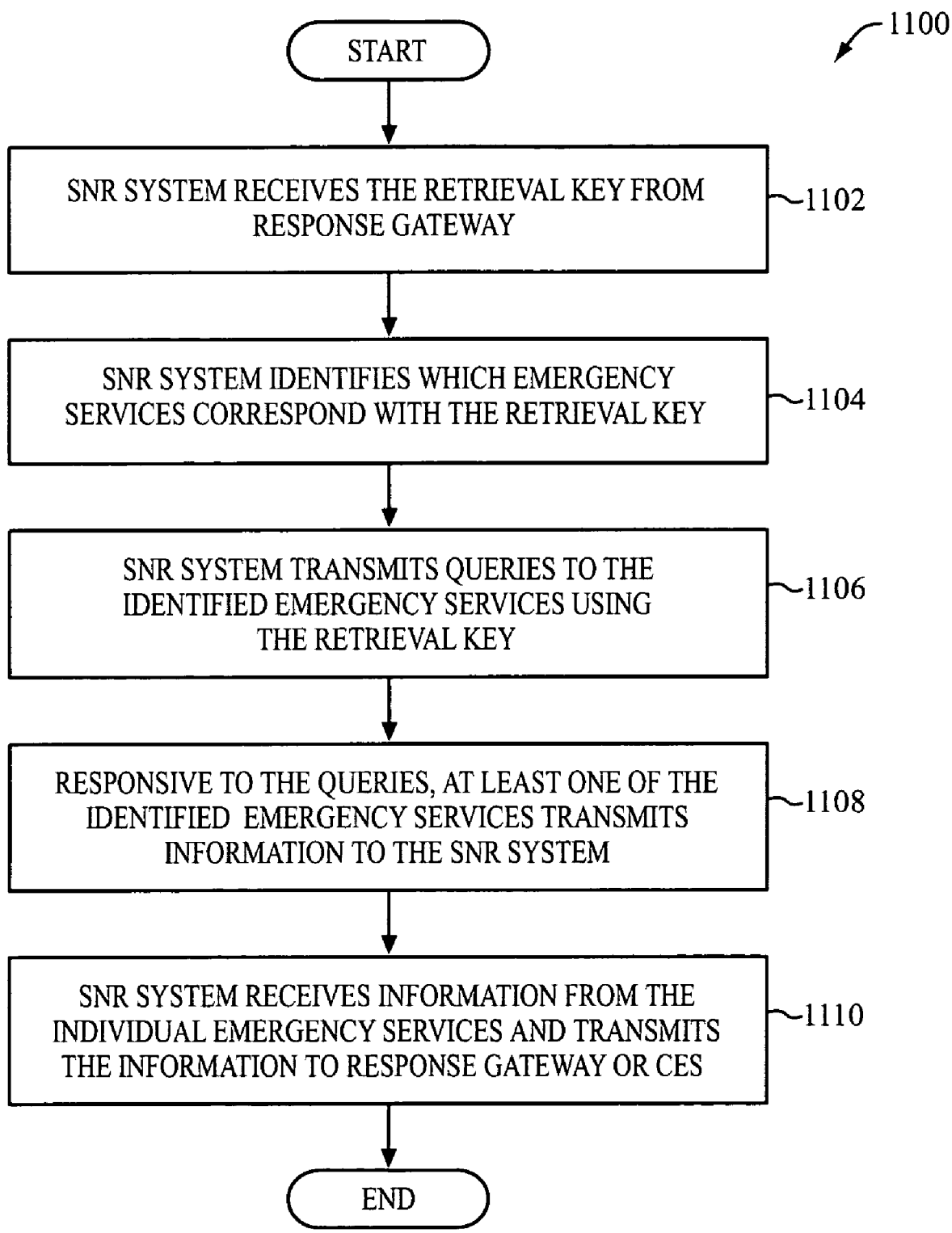
FIG. 11 is a flow chart illustrating another method in another exemplary embodiment of the invention.

FIG. 11 is a flow chart illustrating a method 1100 in another exemplary embodiment of the invention. In step 1102, SNR system 800 receives the retrieval key from response gateway 221. Responsive to the retrieval key, SNR system 800 accesses its directory of the information for ALI database 831, MPC 832, and EASP 833. SNR system 800 identifies which of ALI database 831, MPC 832, and EASP 833 correspond with the retrieval key in step 1104. Assume that SNR system 800 identifies that MPC 832 and EASP 833 correspond with the retrieval key. SNR system 800 then transmits queries to MPC 832 and EASP 833 using the retrieval key in step 1106. MPC 832 and EASP 833 each receive queries and perform any services corresponding with the retrieval key. In step 1108, at least one of MPC 832 and EASP 833 transmit information corresponding with the retrieval key to SNR system 800. For instance, MPC 832, having location information corresponding with the retrieval key, transmits the location information to SNR system 800. EASP 832, having medical information corresponding with the retrieval key, transmits the medical information to SNR system 800. In step 1110, responsive to receiving information corresponding with the retrieval key from MPC 832 and EASP 833, SNR system 800 transmits the information to response gateway 221 or CES 201.

FIG. 12 is a flow chart illustrating a method 1200 in another exemplary embodiment of the invention. In step 1202, SNR system 800 receives the retrieval key from response gateway 221. Responsive to the retrieval key, SNR system 800 accesses its directory of the information for ALI database 831, MPC 832, and EASP 833. SNR system 800 identifies which of ALI database 831, MPC 832, and EASP 833 correspond with the retrieval key in step 1204. Assume that SNR system 800 identifies that MPC 832 and EASP 833 correspond with the retrieval key. SNR system 800 then transmits queries to MPC 832 and EASP 833 using the retrieval key in step 1206. The query includes an address for response gateway 221 or an instruction to transmit information to response gateway 221. MPC 832 and EASP 833 each receive the query and perform any services corresponding with the retrieval key. In step 1208, MPC 832 and EASP 833 transmit information corresponding with the retrieval key to response gateway 221. For instance, MPC 832, having location information corresponding with the retrieval key, transmits the location information to response gateway 221. EASP 832, having medical information corresponding with the retrieval key, transmits the medical information to response gateway 221. The instruction in the queries may also be to transmit information directly to CES 201.

In FIG. 9, responsive to receiving information according to any of methods 1000, 1100, and 1200, response gateway 221 transmits the information to CES 201 in step 910. Transmitting the information in this embodiment means that response gateway 221 voluntarily transmits information to CES 201, and is not limited to the request-response model of the prior art. For instance, in step 910, when response gateway 221 receives the location information originating from MPC 832, response gateway 221 transmits the location information to CES 201. Also in step 910, when response gateway 221 receives the medical information originating from EASP 833, response gateway 221 transmits the medical information to CES 201. Response gateway 221 does not have to wait for a request message from CES 201 before transmitting the information to CES 201. Response gateway 221 may transmit the information at its own volition, but preferably as soon as it is received. Response gateway 221 may use any compatible transport protocol for transmitting the information, such as TCP/IP, HTTP, XML, and RTP.

Response gateway 221 may transmit other messages to CES 201. For instance, response gateway 221 may transmit management data, status reports, etc, to CES 201. CES 201 and/or response gateway 221 may end the emergency event session when all information and services have been provided for the retrieval key or if CES 201 no longer needs information from response gateway 221.

Emergency services network 220 uses a new message set for transmitting the information to CES 201. The message set used by emergency services network 220 allows either CES 201 or response gateway 221 to initiate the transfer of a message. The emergency event session creates a dialog between CES 201 and response gateway 221 so that either one may transmit a message when they have something to provide to the other. As previously discussed, the prior art communication networks have a PSAP-ALI interface that uses a request-response model. Communication network 200 is not limited to the request-response model, as either response gateway 221 or CES 201 may initiate a transfer of a message. Response gateway 221 and CES 201 have an open dialog during an emergency event session, which was not allowed in the prior art.

The new message set also allows response gateway 221 to provide enhanced data types to CES 201, and vice-versa. In the prior art, the PSAP-ALI interface only allowed the ALI database to provide a fixed-length text string to the CES. The new message set is flexible and allows response gateway 221 to transmit larger data streams. For instance, response gateway 221 may transmit information in the form of streaming video, streaming audio, graphics data, voice, text data, binary data, executable instructions or scripts, etc.

In conclusion, the embodiments of the invention described herein illustrate that communication network 200 is advantageously more flexible, expandable, and reliable than prior networks. Conforming emergency systems can communicate with different response gateways by establishing a media channel to interface with the emergency services network. The conforming emergency systems are not reliant on a pair of ALI databases as in the prior art. Also, the response gateways also use a larger and more flexible message set to enhance the size and types of data provided to the conforming emergency systems. Thus, emergency services networks may use modern technology to provide the best possible emergency services.

We claim:

1. A communication network for providing emergency services, said communication network including a packet network, the communication network comprising:
   an emergency services network comprising:
      a plurality of emergency services, and
      a plurality of response gateways connected to the emergency services and connected to the packet network; and
   a plurality of conforming emergency systems connected to the packet network, each conforming emergency system (CES) of the plurality of conforming emergency systems is configured to establish a media channel over the packet network with one of the plurality of response gateways responsive to an emergency event, and is configured to transmit a retrieval key over the media channel to the one response gateway;
   wherein each response gateway is configured to transmit queries for information corresponding with the retrieval key responsive to receipt of the retrieval key from one of the plurality of CES's, is configured to receive the information originating from the emergency services corresponding with the retrieval key, and is configured to transmit the information over the media channel to the one conforming emergency system to provide the CES with information for handling an emergency event.

2. The communication network of claim 1 wherein the CES is configured to establish the media channel using Session Initiation Protocol (SIP).

3. The communication network of claim 1 wherein:
   each CES is configured to transmit a request message for the media channel to the packet network; and
   each response gateway is configured to dynamically establish the media channel responsive to receipt of the request message.

4. The communication network of claim 3 wherein:
   each response gateway is configured to transmit a response message to the packet network indicating an acceptance of the media channel responsive to the request message; and
   each CES is configured to initiate a process to dynamically establish the media channel between the CES and the response gateway that transmitted the response over the packet network responsive to receipt of the response message.

5. The communication network of claim 3 wherein:
   each response gateway is configured to initiate a process to dynamically establish the media channel between the CES and the response gateway that transmitted the request over the packet network responsive to the request message.

6. The communication network of claim 3 wherein:
   each response gateway is configured to negotiate parameters of the media channel before the media channel is dynamically established.

7. The communication network of claim 3 further comprising:
   a channel setup system connected to the packet network, the channel setup system, responsive to receiving the request message from a requesting one of the plurality of CES's, is configured to select one of the plurality of response gateways, and to transmit the request message to the selected response gateway.

8. The communication network of claim 7 wherein:
   the channel setup system includes a data structure that stores information on the plurality of response gateways, the channel setup system is configured to access the information in the data structure to select one of the plurality of response gateways.

9. The communication network of claim 8 wherein the information in the data structure includes at least one of a capacity or current load of each of the plurality of response gateways, an operational status of each of the plurality of response gateways, a number of media channels established with each of the plurality of response gateways, security, a location of each response gateway, data connectivity speed of each response gateway, the type of protocol used by each response gateway, or the type of each response gateway.

10. The communication network of claim 7 wherein the channel setup system comprises a Session Initiation Protocol (SIP) proxy or a SIP server.

11. The communication network of claim 7 wherein:
    each response gateway is configured to transmit a response message indicating an acceptance of the media channel to the channel setup system responsive to the request message; and
    the channel setup system is configured to receive the response message and to transmit the response message to the requesting CES.

12. The communication network of claim 7 wherein:
    each response gateway is configured to transmit a response message indicating an acceptance of the media channel to the requesting CES responsive to the request message.

13. The communication network of claim 1 wherein:
    each response gateway is configured to transmit a request message for the media channel to the packet network; and
    each CES is configured to respond to the request message to dynamically establish the media channel responsive to receipt of the request message.

14. The communication network of claim 13 wherein:
    each CES is configured to transmit a response message to the packet network indicating an acceptance of the media channel responsive to the request message; and
    each response gateway is configured to initiate a process to dynamically establish the media channel between the CES and the one response gateway over the packet network responsive to receipt of the response message.

15. The communication network of claim 13 wherein:
    the CES is configured to initiate a process to dynamically establish the media channel between the CES and the one response gateway over the packet network responsive to receipt of the request message.

16. The communication network of claim 13 wherein:
    the response gateway is configured to negotiate parameters of the media channel before the media channel is dynamically established.

17. The communication network of claim 13 further comprising:
    a channel setup system connected to the packet network, the channel setup system, responsive to receiving the request message from a requesting one of the plurality of response gateways, is configured to transmit the request message to a selected one of the plurality of CES's.

18. The communication network of claim 17 wherein the channel setup system comprises a Session Initiation Protocol (SIP) proxy or a SIP server.

19. The communication network of claim 17 wherein:
the selected CES is configured to transmit a response message indicating an acceptance of the media channel to the channel setup system responsive to the request message; and
the channel setup system is configured to receive the response message and to transmit the response message to the requesting response gateway.

20. The communication network of claim 17 wherein:
the selected CES is configured to transmit a response message indicating an acceptance of the media channel to the requesting response gateway responsive to the request message.

21. The communication network of claim 1 wherein the CES comprises a computer system for a Public Safety Answering Point (PSAP).

22. The communication network of claim 1 wherein the CES comprises a computer system for one of a hospital, a police department, a fire station, a fire alarm company, a security company, an ambulance service, a state 9-1-1 coordinator, the Federal Emergency Management Agency (FEMA), the Department of Homeland Security, the National Geophysical Data Center, or the Center for Disease Control (CDC).

23. The communication network of claim 1 further comprising:
a service/name resolution (SNR) system configured to receive the retrieval key from one of the plurality of response gateways, identify which of the plurality of emergency services correspond with the retrieval key, and transmit a message to the one response gateway indicating the identified emergency services; and
the one response gateway is configured to transmit queries that include the retrieval key to each of the identified emergency services responsive to receipt of the message from the SNR system.

24. The communication network of claim 23 wherein:
at least one of the identified emergency services is configured to transmit information corresponding with the retrieval key to the one response gateway responsive to the queries; and
the one response gateway is configured to transmit the information to a requesting one of the plurality of CES's to facilitate the requesting CES in handling an emergency event.

25. The communication network of claim 23 wherein:
at least one of the identified emergency services is configured to transmit information corresponding with the retrieval key to a requesting one of the plurality of CES's to facilitate the requesting CES in handling an emergency event responsive to the queries.

26. The communication network of claim 23 wherein one of the identified emergency services is configured to initiate a notification service for notifying third parties of the emergency event responsive to a query.

27. The communication network of claim 1 wherein the plurality of emergency services includes at least one of an ALI database, a Mobile Positioning Center (MPC), a Gateway Mobile Location Center (GMLC), an Emergency Auxiliary Service Provider (EASP), and a Voice over Internet Protocol (VoIP) server.

28. The communication network of claim 1 wherein the packet network comprises an Internet Protocol (IP) network.

29. The communication network of claim 1 wherein the retrieval key comprises one of a telephone number, a network address, a Session Initiation Protocol (SIP) address, a trunk ID, a social security number, a street address, an employee ID, an email address, and an incident ID.

30. The communication network of claim 1 wherein the information comprises one of streaming video, streaming audio, graphics data, voice, text or binary data, or executable instructions or scripts.

31. The communication network of claim 1 wherein the emergency event includes a 9-1-1 call.

32. A method of operating a communication network for providing emergency services, the communication network comprising an emergency services network and a plurality of conforming emergency systems connected to a packet network, the emergency services network comprising a plurality of emergency services and a plurality of response gateways connected to the emergency services and to the packet network, the method comprising the steps of:
in each of the conforming emergency systems, establishing a media channel with one of the response gateways;
in one of the conforming emergency systems (CES), responsive to establishing a media channel with one of the response gateways over the packet network and responsive to an emergency event, transmitting a retrieval key over the media channel to the one response gateway;
receiving the retrieval key in the one response gateway, and transmitting a query for information corresponding to the retrieval key to at least one of the plurality of emergency services; and
receiving the information in the one response gateway originating from the emergency services corresponding with the retrieval key, and transmitting the information over the media channel to the CES to provide the CES with information for handling the emergency event.

33. The method of claim 32 wherein the step of establishing a media channel over the packet network comprises:
using Session Initiation Protocol (SIP) to establish the media channel over the packet network.

34. The method of claim 32 wherein the step of establishing a media channel comprises:
transmitting a request message for the media channel from the CES to the packet network; and
receiving the request message in the one response gateway, and responding to the request message to dynamically establish the media channel.

35. The method of claim 34 wherein the step of responding to the request message comprises transmitting a response message to the packet network indicating an acceptance of the media channel, the method further comprising:
receiving the response message in the CES, and initiating a process to dynamically establish the media channel between the CES and the one response gateway over the packet network.

36. The method of claim 34 wherein the step of responding to the request message comprises initiating a process in the CES to dynamically establish the media channel between the CES and the one response gateway over the packet network.

37. The method of claim 34 further comprising the step of:
negotiating parameters of the media channel before the media channel is dynamically established.

38. The method of claim 34 wherein the communication network further comprises a channel setup system connected to the packet network, the method further comprising the step of:
receiving the request message in the channel setup system from the CES, and selecting the one response gateway and transmitting the request message to the one response gateway.

39. The method of claim 38 wherein the channel setup system includes a data structure that stores information on the plurality of response gateways, the method further comprising the step of:
accessing the information in the data structure to select the one response gateway.

40. The method of claim 39 wherein accessing the information in the data structure comprises accessing at least one of a capacity or current load of each of the plurality of response gateways, an operational status of each of the plurality of response gateways, a number of media channels established with each of the plurality of response gateways, security, a location of each response gateway, data connectivity speed of each response gateway, the type of protocol used by each response gateway, or the type of each response gateway.

41. The method of claim 38 wherein the step of responding to the request message comprises transmitting a response message indicating an acceptance of the media channel from the one response gateway to the packet network, the method further comprising the step of:
receiving the response message in the channel setup system, and transmitting the response message to the CES.

42. The method of claim 38 wherein the step of responding to the request message comprises transmitting a response message indicating an acceptance of the media channel from the one response gateway to the CES.

43. The method of claim 32 further comprising the steps of:
transmitting a request message for the media channel from the one response gateway to the packet network; and
receiving the request message in the CES, and responding to the request message to dynamically establish the media channel.

44. The method of claim 43 wherein the step of responding to the request message comprises transmitting a response message to the packet network indicating an acceptance of the media channel, the method further comprising the steps of:
receiving the response message in the one response gateway, and initiating a process to dynamically establish the media channel between the CES and the one response gateway over the packet network.

45. The method of claim 43 wherein the step of responding to the request message comprises initiating a process in the CES to dynamically establish the media channel between the CES and the one response gateway over the packet network.

46. The method of claim 43 further comprising the step of:
negotiating parameters of the media channel before the media channel is dynamically established.

47. The method of claim 43 wherein the communication network further comprises a channel setup system connected to the packet network, the method further comprising the steps of:
receiving the request message in the channel setup system from the one response gateway, and transmitting the request message to the CES.

48. The method of claim 47 wherein the step of responding to the request message comprises transmitting a response message indicating an acceptance of the media channel from the CES to the channel setup system, the method further comprising the steps of:
receiving the response message in the channel setup system, and transmitting the response message to the one response gateway.

49. The method of claim 47 wherein the step of responding to the request message comprises transmitting a response message indicating an acceptance of the media channel from the CES to the one response gateway.

50. The method of claim 32 wherein the communication network further comprises a service/name recognition (SNR) system, the method further comprising the steps of:
receiving the retrieval key from the one response gateway, identifying which of the plurality of emergency services correspond with the retrieval key, and transmitting a message to the one response gateway indicating the identified emergency services; and
receiving the message in the one response gateway from the SNR system, and transmitting queries that include the retrieval key to each of the identified emergency services.

51. The method of claim 50 further comprising the steps of:
responding to the queries in at least one of the identified emergency services by transmitting information corresponding with the retrieval key to the one response gateway; and
transmitting the information from the one response gateway to the CES.

52. The method of claim 50 further comprising the steps of:
responding to the queries in at least one of the identified emergency services by transmitting information corresponding with the retrieval key to the CES.

53. The method of claim 50 further comprising the step of:
initiating a notification service in at least one of the identified emergency services for notifying third parties of the emergency event responsive to a query.

54. The method of claim 32 wherein the communication network further comprises an SNR system, the method further comprising the steps of:
receiving the retrieval key from the one response gateway, identifying which of the plurality of emergency services correspond with the retrieval key, and transmitting queries that include the retrieval key to each of the identified emergency services.

55. The method of claim 54 further comprising the steps of:
responding to the queries in at least one of the identified emergency services by transmitting information corresponding with the retrieval key to the SNR system;
receiving the information corresponding with the retrieval key in the SNR system and transmitting the information to the one response gateway; and
transmitting the information from the one response gateway to the CES.

56. The method of claim 54 further comprising the steps of:

responding to the queries in at least one of the identified emergency services by transmitting information corresponding with the retrieval key to the SNR system; and receiving the information corresponding with the retrieval key in the SNR system and transmitting the information to the CES.

57. The method of claim 54 further comprising the step of:

initiating a notification service in at least one identified emergency service for notifying third parties of the emergency event responsive to a query.

58. The method of claim 54 wherein the queries also include an instruction to transmit the information to the one response gateway, the method further comprising the steps of:

responding to the queries in at least one of the identified emergency services by transmitting information corresponding with the retrieval key to the one response gateway; and transmitting the information from the one response gateway to the CES.

59. The method of claim 54 wherein the queries also include an instruction to transmit the information to the CES, the method further comprising the step of:

responding to the queries in at least one of the identified emergency services by transmitting information corresponding with the retrieval key to the CES.

* * * * *